US009411989B2

(12) United States Patent
Wild

(10) Patent No.: US 9,411,989 B2
(45) Date of Patent: Aug. 9, 2016

(54) CONTINUOUSLY MONITORED CORE TEMPERATURE SENSOR AND METHOD

(71) Applicant: Convotherm Elektrogeraete GmbH, Eglfing (DE)

(72) Inventor: Hannes Wild, Riegsee (DE)

(73) Assignee: Convotherm Elektrogeraete GmbH, Eglfing (DE)

( * ) Notice: Subject to any disclaimer, the term of this patent is extended or adjusted under 35 U.S.C. 154(b) by 504 days.

(21) Appl. No.: 13/721,793

(22) Filed: Dec. 20, 2012

(65) Prior Publication Data

US 2014/0028445 A1 Jan. 30, 2014

Related U.S. Application Data

(60) Provisional application No. 61/581,871, filed on Dec. 30, 2011.

(51) Int. Cl.
G06K 7/00 (2006.01)
F24C 7/08 (2006.01)
G07C 9/00 (2006.01)
G08B 13/14 (2006.01)
G01K 1/02 (2006.01)
G08B 21/02 (2006.01)
H04W 4/00 (2009.01)

(52) U.S. Cl.
CPC .............. G06K 7/0008 (2013.01); F24C 7/082 (2013.01); G01K 1/024 (2013.01); G07C 9/00 (2013.01); G08B 13/1427 (2013.01); G08B 21/0275 (2013.01); G08B 21/0247 (2013.01); H04W 4/008 (2013.01)

(58) Field of Classification Search
None
See application file for complete search history.

(56) References Cited

U.S. PATENT DOCUMENTS

| 4,639,578 A * | 1/1987 | Payne ........................ 219/468.2 |
| 5,128,516 A * | 7/1992 | Plasko ................... H05B 3/746 219/494 |
| 5,799,822 A * | 9/1998 | Rudewicz ............... G07F 9/026 219/678 |
| 6,169,494 B1 | 1/2001 | Lopes |
| 7,861,542 B2 * | 1/2011 | Rozendaal et al. ............. 62/127 |
| 8,783,167 B1 * | 7/2014 | Titel et al. ........................ 99/342 |
| 2002/0066279 A1 * | 6/2002 | Kiyomatsu ..................... 62/125 |
| 2002/0084903 A1 | 7/2002 | Chaco |
| 2004/0100380 A1 * | 5/2004 | Lindsay et al. ............... 340/540 |

(Continued)

FOREIGN PATENT DOCUMENTS

WO    2008113578 A1    9/2008

OTHER PUBLICATIONS

International Search Report dated Apr. 23, 2013 for PCT application No. PCT/IB2012/002776.

Primary Examiner — Fekadeselassie Girma
Assistant Examiner — Chico A Foxx
(74) Attorney, Agent, or Firm — Ohlandt, Greeley, Ruggiero & Perle, LLP

(57) ABSTRACT

A system that provides notice of a lost signal. A wireless device and a control device employ radio frequency identification (RFID) technology, which uses radio frequency signals to communicate with one another via communication link having a reception range. The control device transmits a signal to the wireless device via the communication link. The wireless device responds by transmitting a return signal via the communication link. The control device processes the return signal to determine if the wireless device is within the reception range, if not, the control device provides an audible, written or visual alarm.

14 Claims, 2 Drawing Sheets

(56) References Cited

U.S. PATENT DOCUMENTS

| | | | |
|---|---|---|---|
| 2008/0144697 A1* | 6/2008 | Stewart et al. | 374/141 |
| 2008/0284604 A1* | 11/2008 | Rubinstein | 340/572.4 |
| 2009/0139981 A1* | 6/2009 | Moon | A47J 37/0623 219/490 |
| 2009/0188396 A1* | 7/2009 | Hofmann et al. | 99/342 |
| 2010/0012645 A1* | 1/2010 | Baier | 219/413 |
| 2010/0102993 A1* | 4/2010 | Johnson | 340/988 |
| 2013/0305933 A1* | 11/2013 | Heidrich | A47J 27/62 99/331 |

* cited by examiner

CONTINUOUSLY MONITORED CORE TEMPERATURE SENSOR AND METHOD

RELATED APPLICATION

This application claims the priority of U.S. Provisional Patent Application Ser. No. 61/581,871, filed on Dec. 30, 2011, the entire contents of which are incorporated herein.

BACKGROUND

1. Field of the Disclosure

This disclosure relates to a system and a method that detects movement of a wireless device.

2. Background of the Disclosure

Radio-Frequency Identification (RFID) technology is typically used to transfer data from an electronic tag attached to an object for the purpose of tracking or identifying the object. The RFID tag includes an RF transmitter and an RF receiver. An RF reader device transmits an encoded RF signal to interrogate the tag. Upon receipt of the transmitted RF signal, the tag transmits a return RF signal with its identification information. RFID technology has been used in many applications to track inventory, assets, people and others. For example, the tag may be attached to cars, computer equipment, books, mobile phones, containers, medical assets, and others.

Global Positioning System (GPS) technology has also been used to track various objects.

RFID and GPS technologies have been successful in tracking a location of an object and/or determining its identity. However, these systems lack an ability to determine that the object is lost or moved outside of a reception range of the reader.

If the tagged object is portable, a problem arises when the reader does not receive the return RF signal due to either failure or transport of the portable device out of a reception range of the reader. If a failure, the response is taken care of by maintenance personnel. If the portable device is missing, there is no immediate response and the activity of the apparatus may be shut down.

Thus, there is a need for a tracking system that can determine if an object has been moved out of a reception range of the reader.

SUMMARY OF THE DISCLOSURE

A system of the present disclosure comprises a control device and a wireless device disposed to communicate with one another via a communication link that has a reception range. The control device broadcasts a signal via the communication link. The wireless device upon receipt of the signal broadcasts a return signal via the communication link. The control device processes the return signal to determine if the wireless device is within the reception range, and if not, provides an alert.

A system comprising: a control device and a wireless device disposed to communicate with one another via a communication link that has a reception range; wherein the control device broadcasts a signal via the communication link, wherein the wireless device upon receipt of the signal broadcasts a return signal via the communication link, and wherein the control device processes the return signal to determine if the wireless device is within the reception range, and if not, provides an alert.

Preferably, the signal and the return signal are broadcast on a periodic basis, wherein the control device determines if a characteristic of the return signal has reached a predetermined value, and if so, provides the alert.

The characteristic of the return signal is selected from the group consisting of: signal strength, amplitude, phase, angular phase shift, and interference.

The alert is a member of the group consisting of: audible, written, visual, text messages, electronic data interchange, internet protocols.

The signal and the return signal are a ping signal and a pong signal, respectively. The return signal carries a parameter.

The system further comprising a food service equipment, in which one of the control device and the wireless device is located, and wherein the food service equipment is a member of the group consisting of: oven, grill, broiler, food warmer, food display, ice making equipment, refrigeration equipment, beverage dispensing equipment, steamers, convection ovens, combination ovens, kettles, braising pans, skillets, freezer, serving lines, filtration equipment, pasta cookers, ranges, broilers, griddles, induction, conveyers, dishwasher, impinger, toaster, microwave, microwave combination oven, mixer, prep table, reach in coolers.

The wireless device further comprises a sensor that senses a parameter selected from the group consisting of: temperature, humidity, pressure, barcode signal, video signal, aroma, gas-air composite, lambda value, oxygen sensor, pH value, alkaline value, conductance, color, density, weight, volume, length, mass, time, electric current, light intensity and force.

The control device and the wireless device are each disposed within the food service equipment.

A method comprising: broadcasting a signal with a control device via a communication link that has a reception range; upon receipt of the signal broadcasting with a wireless device a return signal via the communication link; upon receipt of the return signal, processing with the control device the return signal to determine if the wireless device is within the reception range; and providing an alert if the return signal is not within the reception range.

BRIEF DESCRIPTION OF THE DRAWINGS

Other and further objects, advantages and features of the present disclosure will be understood by reference to the following specification in conjunction with the accompanying drawings, in which like reference characters denote like elements of structure and.

DESCRIPTION OF THE PREFERRED EMBODIMENT

The system of the present disclosure has utility in many applications in which a wireless device and a control device communicate with one another via a wireless communication link. For example, a parameter detected by the wireless device is communicated via the wireless communication link to the control device. The parameter may be selected selected from the group consisting of: temperature, humidity, pressure, barcode signal, video signal, aroma, gas-air composite, lambda value, oxygen sensor, pH value, alkaline value, conductance, color, density, weight, volume, length, mass, time, electric current, light intensity and force.

System 20, for example, can be used in the food service industry for a food service equipment that is a member of the group consisting of: oven, grill, broiler, food warmer, food display, ice making equipment, refrigeration equipment, beverage dispensing equipment, steamers, convection ovens, combination ovens, kettles, braising pans, skillets, freezer, serving lines, filtration equipment, pasta cookers, ranges, broilers, griddles, induction, conveyers, dishwasher, impinger, toaster, microwave, microwave combination oven, mixer, prep table, reach in coolers, and the like.

Figure 1:
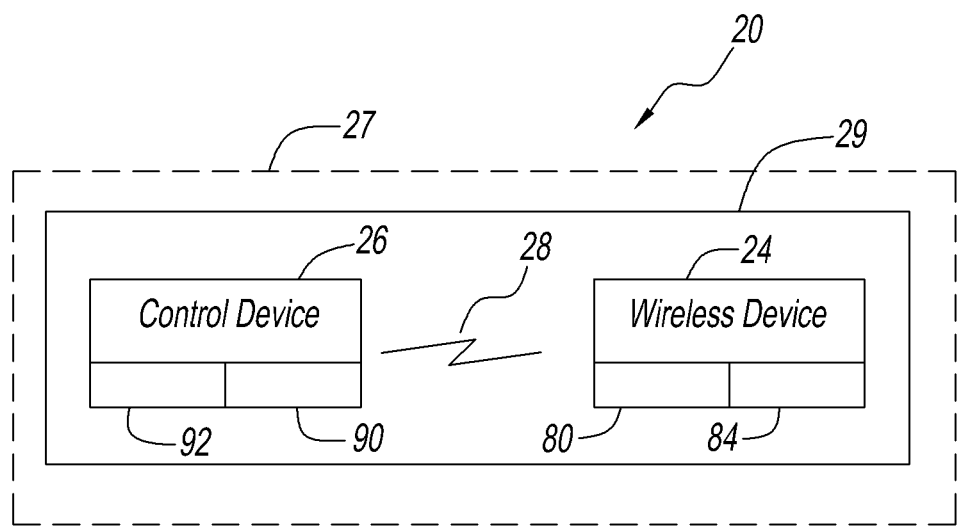
FIG. 1 is a block diagram of a system of the present disclosure.

Referring to FIG. 1, a system 20 of the present disclosure comprises a wireless device 24 and a control device 26 that communicate with one another via a wireless communication link 28, which has a reception range 27. Wireless device 24 is placed in a position to capture an event and to communicate the captured event via wireless communication link 28 to control device 26. Should a user of system 20 take wireless device 24 out of the position and out of reception range 27, control device 26 provides an alert or alarm. In FIG. 1, wireless device 24 and control device 26 are configured in a single enclosure 29. In other embodiments, wireless device 24 and control device 26 can be configured in separate enclosures. By way of example and completeness of description, system 20 of the present disclosure is being shown in food service equipment, particularly an oven.

Figure 2:
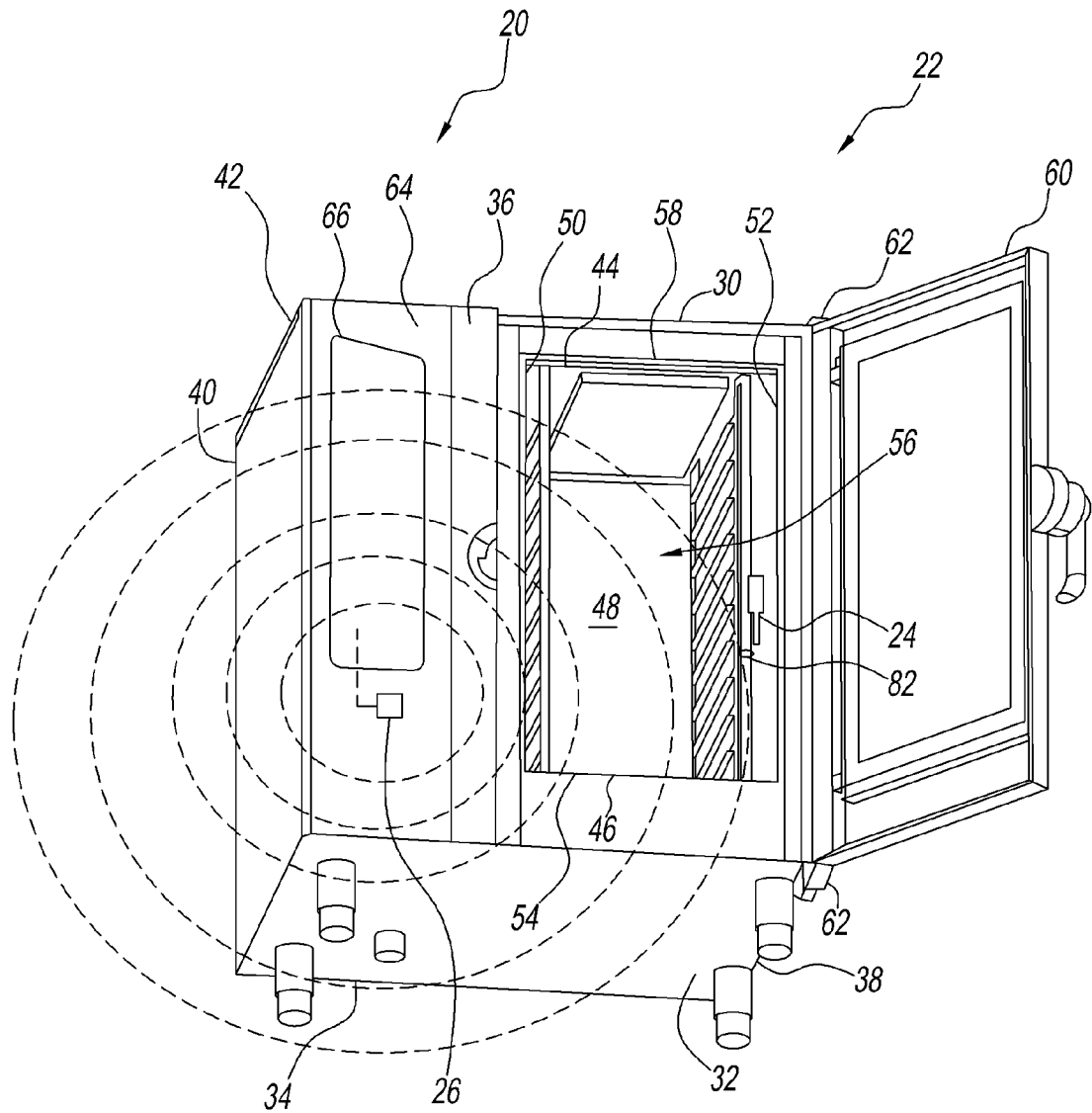
FIG. 2 is a perspective view in part and a block diagram in part of an embodiment of the system of the present disclosure.

Referring to FIG. 2, system 20 in one embodiment of the present disclosure comprises an oven 22 that performs an activity of cooking food. Oven 22 comprises a top wall 30, a bottom wall 32, a back wall 34, a side wall 38 and a side wall 40 that are configured to form an outer enclosure. An inner top wall 44, an inner bottom wall 46, an inner back wall 48, an inner side wall 50 and an inner side wall 52 are configured to form an inner enclosure 54 with a cooking chamber 56. Inner enclosure 54 is disposed within outer enclosure 42.

Front wall 36 comprises an opening 58 that is covered by a door 60, which is shown in an open position in FIG. 2. A pair of hinges 62 attaches door 60 to outer enclosure 42 so as allow door 60 to rotate between the open position and a closed position in which door 60 covers opening 56. A control panel 64 is disposed on front wall 36 between opening 58 and sidewall 40. Control panel 64 comprises a display 66 and various control buttons or knobs for manual control and/or input to a controller (not shown), which controls the cooking of food in cooking chamber 56 and the presentation of operating data and messages on display 66.

Referring to FIGS. 1 and 2, wireless device 24 is held within cooking chamber 56 by a holding bracket 82. For example, wireless device 24 may be a core temperature sensor, which is available from Jumo or Miele. As shown in FIG. 2, control device 26 is disposed, for example, in a space between side wall 40 of outer enclosure 42 and inner side wall 50 of inner enclosure 54 and includes a transmitter/receiver 90 that broadcasts a signal via communication link 28. Wireless device 24 includes a sensor 80 that senses temperature and a transmitter/receiver 84. Upon receipt of the signal from control device 26, transmitter/receiver 84 broadcasts a return signal that includes the sensed temperature. Control device 26 further includes a tracking feature 92 that monitors and processes the received return signal. Transmitter/receiver 84 and transmitter/receiver 90 may each comprise a separate transmitter and receiver or a combined transmitter/receiver.

In a preferred embodiment, wireless device 24 and control device 26 employ radio frequency identification (RFID) technology, which uses radio frequency signals to transfer data (i.e., a temperature parameter) from wireless device 24 to control device 26. In one embodiment, wireless device 24 is powered by energy derived from a radio frequency signal transmitted by transmitter/receiver 90 of control device 26. Wireless device 24 uses this energy to operate sensor 80 to obtain a signal indicative of a current temperature sample, which is transmitted back to control device 26 via communication link 28. In another embodiment, wireless device 24 uses a battery for operating power.

In operation, control device 26 obtains temperature parameters on a periodic basis. Each time transmitter/receiver 90 transmits a signal via communication link 28, wireless device 24 operates sensor 80 to obtain a radio frequency signal indicative of a current temperature value. Transmitter/receiver 84 transmits this radio frequency signal via communication link 28 to control device 26. Tracking feature 92 processes the received radio frequency signal from wireless device 24 to determine the location of wireless device 24 (i.e., if it is in or removed from its assigned location) and to obtain the current temperature value.

In operation, tracking feature 92 detects a removal of wireless device 24 from its assigned location. Tracking feature 92, e.g., determines from a characteristic of the received signal whether wireless device 24 has been moved from its assigned location. For example, the characteristic of the received signal may include one or more of signal strength, amplitude, phase, angular phase shift, and interference.

For example, the signal strength or amplitude will decrease as wireless device 24 is moved from its assigned location and away from control device 26. Tracking feature 92 compares the signal strength of consecutive radio signals received from wireless device 24 to detect a motion of wireless device 24. If there is no return signal, tracking feature 92 provides an alert or alarm. In another embodiment, tracking feature 92 may be a first activity of control device 26 and the temperature monitoring may be a second independent activity of control device 26.

Alternatively, tracking feature 92 may cause transmitter/receiver 90 to send ping signals via communication link 28 at a fast enough rate to detect motion of wireless device 24. Wireless device 24 responds with a pong signal sent by transmitter/receiver 84 via communication link 28. Tracking feature 92 then compares the signal strength of consecutive pong signals received from wireless device 24 to detect a motion of wireless device 24.

Should the signal be lost, control device 26 provides an alert, which may be one or more of audible, written, visual, text messages, electronic data interchange, internet protocols. For example, if wireless sensing device 24 is removed from oven 22 and carried out of reception range 27, control device 26 may post a warning message on display 66 and/or provide an audible alert.

Control device 26 may be operated in conjunction with the oven control track feature described in German Offenlegungsschrift No. 10 2008 026 481 A1 to determine the identity of the chef or other responsible person on duty at the time of the lost signal event. This person could then be notified by sending a message to his or her reception device, e.g., a mobile phone, a computing device or other device capable of receiving a voice or written message.

In other embodiments, wireless device 24 may sense other parameters, such as humidity, light intensity, liquid level, identity of a device or article and other parameters. For example, wireless device 24 can be a wireless bar code scanner and control device 26 can be located in a nearby station within a reception range.

The present disclosure having been thus described with particular reference to the preferred forms thereof, it will be obvious that various changes and modifications may be made therein without departing from the scope of the present disclosure as defined in the appended claims.

What is claimed is:

1. A system for continually monitoring a parameter in food service equipment, said system comprising:
   a wireless device attached to said food service equipment, wherein said wireless device has a sensor that continually monitors said parameter and a transmitter/receiver; and
   a control device attached to said food service equipment, wherein said control device has a tracking feature that monitors and processes information received from said transmitter/receiver of said wireless device and a transmitter/receiver,
      wherein said control device and said wireless device communicate with one another via a communication link that has a reception range;
      wherein said control device broadcasts a signal via said communication link to said wireless device,
      wherein said wireless device obtains a measurement of said parameter and broadcasts a signal via said communication link to said control device,
      wherein said signal broadcast by said wireless device includes said measurement of said parameter, and
      wherein said signals from said control device and signals from said wireless device are broadcast at a fast enough rate such that consecutive signals broadcast from said wireless device indicate motion of said wireless device, and wherein said tracking feature of said control device processes consecutive signals broadcast by said wireless device to obtain said measurement of said parameter and determine if said wireless device is within said reception range, and provide an alert if said wireless device is not in said reception range, or if there is no return signal.

2. The system of claim 1, wherein said control device determines if said wireless device is within said reception range based on whether a characteristic of said signals broadcast from said wireless device has reached a predetermined value.

3. The system of claim 2, wherein said characteristic of said signals broadcast from said wireless device is selected from the group consisting of: signal strength, amplitude, phase, angular phase shift, and interference.

4. The system of claim 1, wherein said alert is selected from the group consisting of: audible, written, visual, text messages, electronic data interchange, and internet protocols.

5. The system of claim 1, wherein said signals from said control device and said signals from said wireless device are a ping signal and a pong signal, respectively.

6. The system of claim 1, wherein said food service equipment is selected from the group consisting of: oven, grill, broiler, food warmer, food display, ice making equipment, refrigeration equipment, beverage dispensing equipment, steamers, convection ovens, combination ovens, kettles, braising pans, skillets, freezer, serving lines, filtration equipment, pasta cookers, ranges, broilers, griddles, induction, conveyers, dishwasher, impinger, toaster, microwave, microwave combination oven, mixer, prep table, reach in coolers.

7. The system of claim 6, wherein said parameter is selected from the group consisting of: temperature, humidity, pressure, barcode signal, video signal, aroma, gas-air composite, lambda value, oxygen sensor, pH value, alkaline value, conductance, color, density, weight, volume, length, mass, time, electric current, light intensity and force.

8. A method for continually monitoring a parameter in food service equipment, the method comprising:
   monitoring said parameter of said food service equipment with a wireless device attached to said food service equipment, wherein said wireless device has a transmitter/receiver;
   broadcasting signals from a control device attached to said food service equipment via a communication link that has a reception range to said wireless device, wherein said control device has a transmitter/receiver and a tracking feature that monitors and processes information received from said transmitter/receiver of said wireless device;
   receiving said signals broadcast from said control device by said wireless device;
   obtaining a measurement of said parameter by said wireless device;
   broadcasting from said wireless device a signals via said communication link to said control device, wherein said signals broadcast from said wireless device includes said measurement of said parameter;
   receiving said signals broadcast from said wireless device by said control device, wherein said signals from said control device and signals from said wireless device are broadcast at a fast enough rate such that consecutive signals broadcast from said wireless device indicate motion of said wireless device, and wherein said tracking feature of said control device processes consecutive signals broadcast by said wireless device;
   processing by said control device said signals broadcast from said wireless device to obtain said measurement of said parameter and determine if said wireless device is within said reception range; and
   providing an alert if said signals broadcast from said wireless device indicate that said wireless device is not within said reception range, or if there are no signals from said wireless device.

9. The method of claim 8, wherein said control device determines if said wireless device is within said reception range based on whether a characteristic of said signals broadcast from said wireless device has reached a predetermined value.

10. The method of claim 9, wherein said characteristic of said signals broadcast from said wireless device is selected from the group consisting of: signal strength, amplitude, phase, angular phase shift, and interference.

11. The method of claim 8, wherein said alert is selected from the group consisting of: audible, written, visual, text messages, electronic data interchange, and internet protocols.

12. The method of claim 8, wherein said signals broadcast from said control device and said signals broadcast from said wireless device are a ping signal and a pong signal, respectively.

13. The method of claim 8, wherein said food service equipment is selected from the group consisting of: oven, grill, broiler, food warmer, food display, ice making equipment, refrigeration equipment, beverage dispensing equipment, steamers, convection ovens, combination ovens, kettles, braising pans, skillets, freezer, serving lines, filtration equipment, pasta cookers, ranges, broilers, griddles, induction, conveyers, dishwasher, impinger, toaster, microwave, microwave combination oven, mixer, prep table, reach in coolers.

14. The method of claim 8, wherein said parameter is selected from the group consisting of: temperature, humidity, pressure, barcode signal, video signal, aroma, gas-air composite, lambda value, oxygen sensor, pH value, alkaline value, conductance, color, density, weight, volume, length, mass, time, electric current, light intensity and force.

* * * * *